United States Patent [19]

Partus

[11] 4,412,853
[45] Nov. 1, 1983

[54] METHOD OF MAKING OPTICAL WAVEGUIDE FIBER PREFORM STARTER TUBES

[75] Inventor: Fred P. Partus, Marietta, Ga.

[73] Assignee: Western Electric Company, Inc., New York, N.Y.

[21] Appl. No.: 278,158

[22] Filed: Jun. 29, 1981

[51] Int. Cl.³ .................... C03B 23/08; C03B 37/025
[52] U.S. Cl. ......................................... 65/3.12; 65/29
[58] Field of Search ...................... 65/3.11, 3.12, 3.13, 65/3.2, 29; 350/96.34

[56] References Cited

U.S. PATENT DOCUMENTS

| | | | |
|---|---|---|---|
| Re. 28,029 | 6/1973 | Keck et al. | 65/3.12 |
| 4,049,413 | 9/1977 | French | 65/3.15 |
| 4,087,266 | 5/1978 | Irven et al. | 65/3.12 X |
| 4,155,733 | 5/1979 | Sanbank et al. | 65/3.12 |
| 4,191,545 | 3/1980 | MacChesney et al. | 65/3.12 |
| 4,202,682 | 5/1980 | Black | 65/3.2 X |
| 4,204,850 | 5/1980 | Dominick et al. | 65/3.12 |
| 4,204,851 | 5/1980 | Nolan | 65/3.12 |
| 4,217,027 | 8/1980 | MacChesney et al. | 65/3.12 X |
| 4,230,396 | 10/1980 | Olshansky et al. | 65/3.11 X |
| 4,280,829 | 7/1981 | Sheth | 65/3.12 |
| 4,335,934 | 6/1982 | Black et al. | 65/3.12 X |

FOREIGN PATENT DOCUMENTS 51-71313  6/1976  Japan .................................... 65/3.11

OTHER PUBLICATIONS

Partus et al., "Lightguide Preform Manufacture", The Western Electric Engineer, Winter 1980, pp. 39–46.
Akiyama et al., "Long Length Optical Fiber by the MCVD Method"; Sixth European Conference on Optical Communication; York, England; Sep. 16–19, 1980, pp. 29–32.

*Primary Examiner*—Richard V. Fisher
*Attorney, Agent, or Firm*—David P. Kelley

[57] ABSTRACT

A glass tube is formed having a mean cross-sectional tube wall area less than a preselected mean cross-sectional area. Additional glass differing in composition from that of the glass tube, but having an index of refraction substantially equal to that of the glass tube, is then fused onto a surface of the tube by vapor deposition, outside vapor-phase oxidation or outside vapor-phase axial deposition until the tube wall obtains the preselected mean cross-sectional area.

1 Claim, 14 Drawing Figures

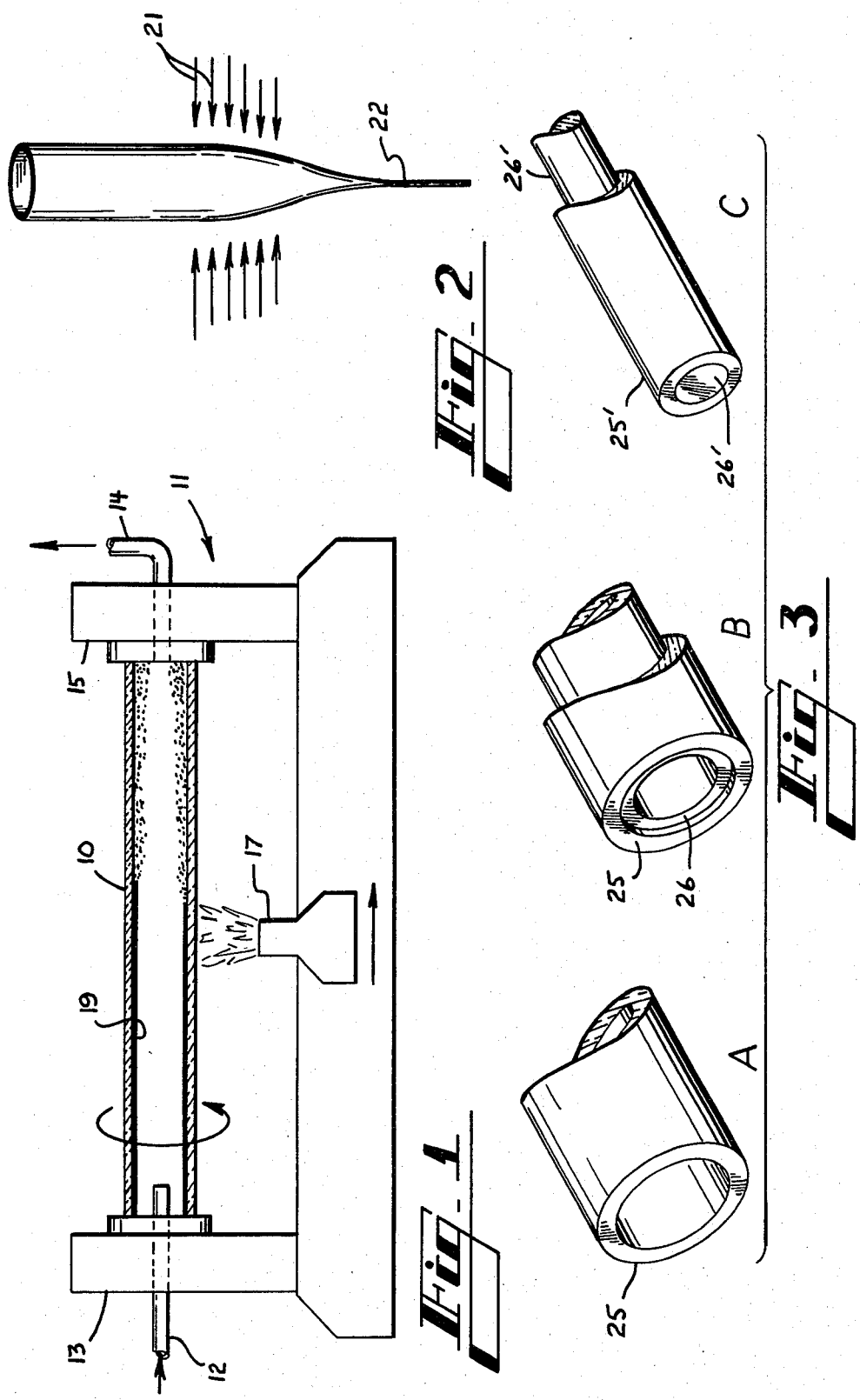

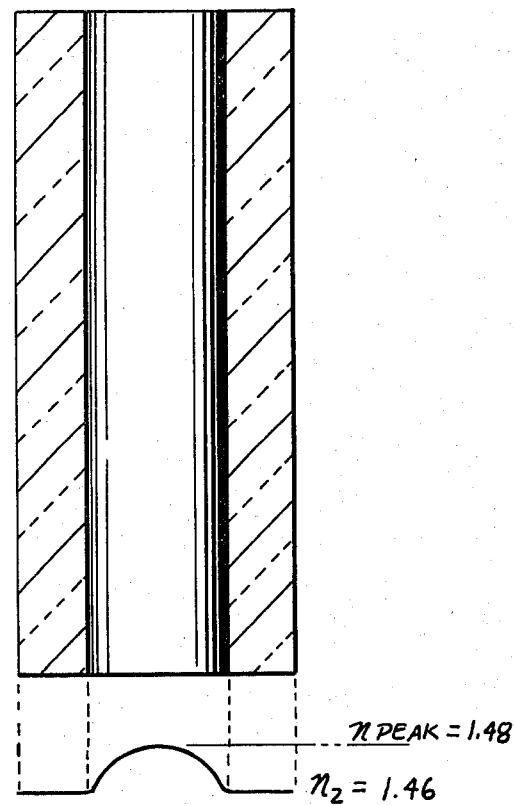
Fig_4
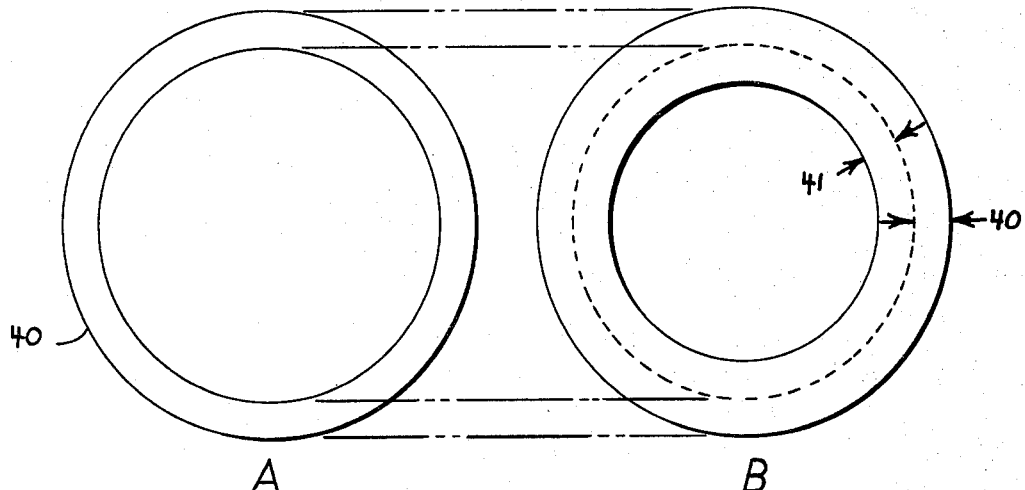
Fig_6

METHOD OF MAKING OPTICAL WAVEGUIDE FIBER PREFORM STARTER TUBES

TECHNICAL FIELD

This invention relates generally to methods of making optical waveguide fiber preforms and particularly to methods of making starter tubes from which such preforms are fabricated. The term "starter tube" is herein intended to mean a glass tube having a substantially uniform index of refraction upon a surface of which glass is to be deposited in forming an optical waveguide fiber preform.

BACKGROUND OF THE INVENTION

Optical fibers are drawn from glass preforms which, during their fabrication, are given a desired refractive index profile. This is done by a process whereby vapors of dopant materials such as $SiCl_4$, $GeCl_4$, $POCl_3$ and $BCl_3$, and mixtures thereof, are entrained in a carrier gas such as oxygen and drawn as a vapor stream into the interior of a glass "starter" tube. The preform starter tube is rotated while a torch repeatedly traverses its length, and as the vapor stream passes through the tube and encounters the band of heat adjacent the torch, a thermal reaction occurs creating oxides which deposit on and fuse to the interior surface of the tube. After numerous torch passes have formed numerous deposition layers of the same or differing compositions, the tube is collapsed into a solid, rod-shaped preform. This process is termed the Modified Chemical Vapor Deposition or MCVD Process.

Once the preform has been made fiber is drawn from it. This is done by applying heat to a lower portion of the preform causing its lower end to soften from which a thin fiber is drawn. Once the fiber is drawn it mirrors a scaled down version of the preform itself, with that portion of the preform formed by the starter tube becoming the fiber cladding and with that portion formed by vapor deposition layers becoming the fiber core.

As is also well known optical fibers may be manufactured with their core having a uniform index of refraction somewhat higher than that of their cladding, or with their core having a graded index of refraction which, for example, increases parabolically from the area adjacent the cladding to the center of the fiber. Optical fibers of the graded index of refraction type offer superior bandwidth since those rays of light which travel a serpentine path reflected back and forth off the cladding tend to move along the fiber at the same average velocity as those rays which travel along the core center-line. In the fabrication of an optical fiber preform of the stepped index of refraction type the composition of the vapor stream passing through the tube during the vapor deposition process remains constant. Conversely, a graded index of refraction core requires that the composition of the vapor stream be changed many times so that the various layers of glass being fused to the interior of the starter tube possess slight differences in composition to provide slight differences in indexes of refraction. This compositional change can be effected by control of the vapor stream generation. For example, where the vapor stream is generated by bubbling a carrier gas such as oxygen through several bubblers that respectively house dopant materials such as $SiCl_4$, $GeCl_4$, $POCl_3$ and $BCl_3$ in liquid form, the heat inputted into the bubblers may be changed to increase or decrease the rate at which any particular dopant is vaporized. The various resultant blends then produce glass layers of different indexes of refraction.

A common problem experienced with the just described process is that the preform starter tubes tend to vary in size and shape. This is virtually an inherent characteristic of glass tubes made by extrusion or free-draw. As a result it is necessary to measure each starter tube and to construct and execute vapor stream generation control programs specific to many different starter tube sizes. In other words, a deposition program must be made for each starter tube having a mean cross-sectional wall area over its entire length different from that of a standard size. The development and implementation of chemical vapor deposition control programs for various size starter tubes has proved to be tedious and difficult to execute and monitor, particularly in a manufacturing environment. It thus would be of tremendous benefit if a method could be devised for fabricating optical waveguide fiber preform starter tubes of uniform size.

SUMMARY OF THE INVENTION

In one preferred form of the invention a method is provided for making an optical waveguide fiber preform starter tube of preselected mean cross-sectional tube wall area. The method comprises the steps of forming a glass tube having a mean cross-sectional tube wall area less than said preselected area and then fusing additional glass of a composition differing from that of the glass tube onto the interior surface of the tube by vapor deposition and/or onto the exterior surface of the tube by outside vapor phase oxidation or outside vapor phase axial deposition until the tube wall substantially obtains said preselected mean cross-sectional area.

In another preferred form of the invention a method is provided for making an optical waveguide fiber preform starter tube having a tube wall of preselected cross-sectional area. Here the method comprises the steps of extruding or free drawing a glass tube having a tube wall cross-sectional area less than said preselected area, measuring the wall cross-sectional area of the glass tube, and fusing successive layers of glass having a composition different from that of the glass tube onto the interior surface of the tube by vapor deposition until the tube wall cross-sectional area substantially equals said preselected area.

In yet another form of the invention a method is provided of making an optical waveguide fiber preform starter tube of a preselected mean cross-sectional area and of a homogeneously uniform index of refraction comprising the steps of extruding meaning herein throughout to include nonforced techniques such as the double crucible) or free-drawing a glass tube composed of at least 99.9% pure fused quartz having a mean cross-sectional area less than said preselected area, and fusing additional layers of glass to the tube until said preselected area is obtained by reacting oxygen with vaporized clorides selected from the group consisting of $SiCl_4$, $GeCl_4$, $POCl_3$, $BCl_3$ and $CCl_2F_2$ adjacent at least one surface of the tube.

BRIEF DESCRIPTION OF THE DRAWING

FIG. 1 is a schematic illustration of a lathe upon which an optical waveguide fiber preform tube is mounted and being constructed in accordance with the Modified Chemical Vapor Deposition Process;

FIG. 2 is a schematic illustration of an optical fiber preform from which a fiber is being drawn;

FIG. 3A is a perspective view of a segment of an optical waveguide fiber preform starter tube, FIG. 3B is a perspective view of the starter tube upon an interior surface of which layers of glass have been deposited in accordance with the Modified Chemical Vapor Deposition Process illustrated in FIG. 1, and FIG. 3C is a perspective view of an optical waveguide preform after the preform tube has been collapsed;

FIG. 4 is a schematic illustration of an optical fiber preform in a collapsed state with the portion formed from the starter tube shown in cross-section;

FIG. 6A is an end view of an extruded or free-drawn glass starter tube while FIG. 6B is an end view of the same tube following a fusion of additional layers of glass by the Modified Chemical Vapor Deposition Process in accordance with principles of the present invention.

DETAILED DESCRIPTION

Figure 5:
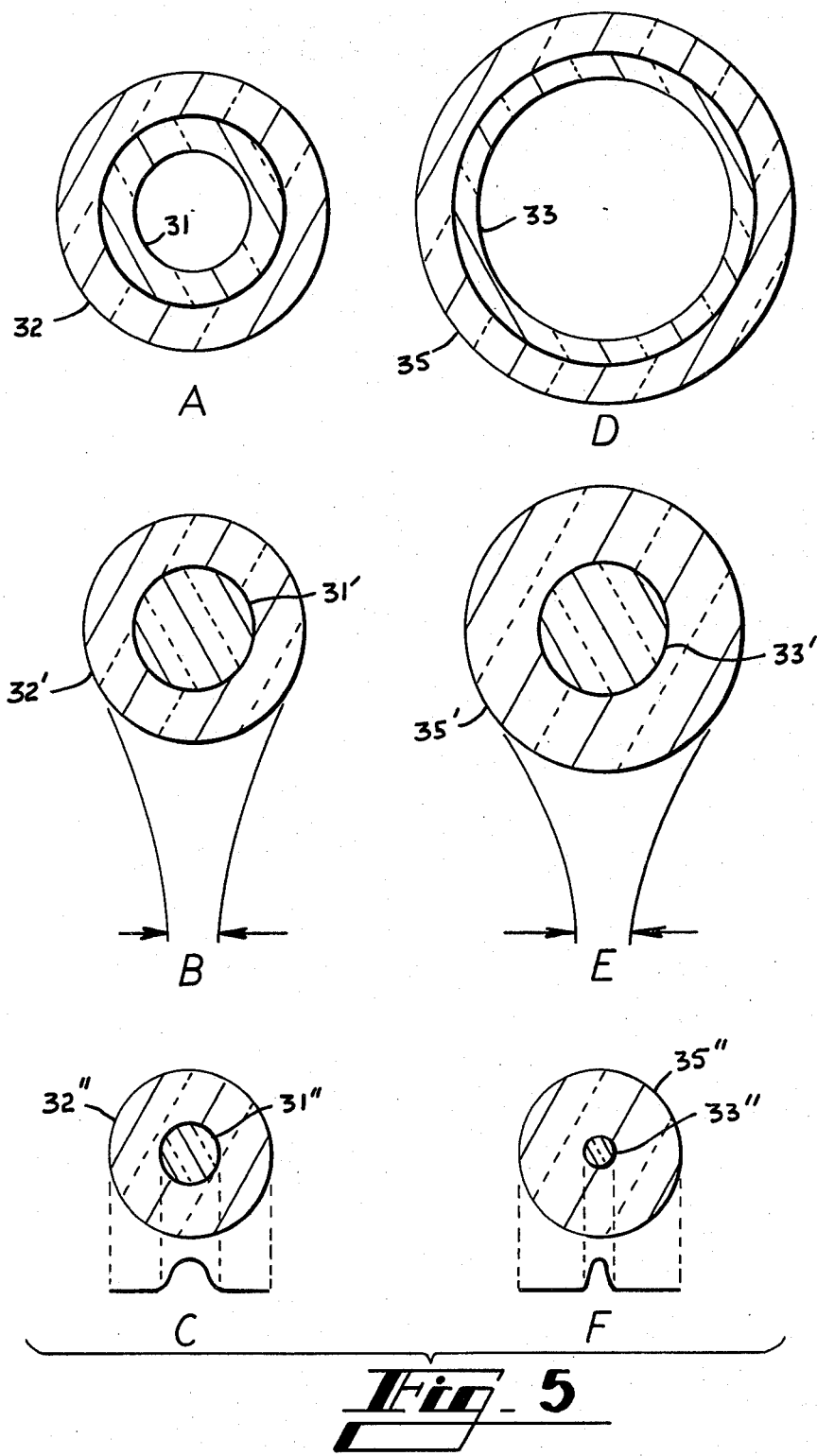
FIGS. 5A-C and FIGS. 5D-F are each sequential series illustrations in cross-section of two optical fibers made from two preform starter tubes of mutually different cross-sectional areas.

The previously described MCVD process is schematically illustrated in FIG. 1 of the drawing. Here a glass preform tube 10 is depicted as rotating on a lathe 11 while a vapor stream is fed into the tube through an intake conduit 12 that extends through a lathe headstock 13. Reaction products are exhausted out from the downstream end of the tube through another conduit 14 that extends through a lathe tailstock 15. As the vapor stream passes through the tube 10 a torch 17 traverses the length of the tube, repeatedly, creating a moving band of heat within the tube. Oxides 18 created by the reaction of the stream in the band of heat above the torch are shown within the tube downstream of the band of heat while those which have already settled upon the interior surface of the tube are shown as a fused layer of glass 19. After the desired number of layers have been built up within the interior of the preform tube the temperature of the torch is increased causing the tube to be collapsed into a solid rod. The rod-shaped preform thus formed is subsequently used to make optical fiber through being drawn through a drawing furnace. FIG. 2 schematically illustrates the drawing process where heat represented by arrows 21 is shown being applied to the lower end of a preform. For a detailed discussion of this procedure for making preforms, reference may be had to U.S. Pat. No. 4,217,027 issued Aug. 12, 1980 to John B. MacChesney and Paul B. O'Connor and also by reference to the article coauthored by Monsoor A. Saifi and Applicant titled "Lightguide Preform Manufacture" which appears at pages 39-47 in the Winter 1980 issue in the Western Electric ENGINEER.

FIG. 3 sequentially illustrates the shape of the preform during its three stages of manufacture as just described. FIG. 3A shows a starter tube 25 that is made by conventional glass extrusion or free drawing techniques and having a substantially uniform index of refraction. FIG. 3B shows the starter tube 25 after numerous layers of glass have been fused to the interior surface thereof by the Modified Chemical Vapor Deposition Process illustrated in FIG. 1. Thus in FIG. 3B a composite 26 of numerous vapor deposition layers is shown fused to the interior surface of the starter tube 25. Finally, FIG. 3C shows the preform after it has been collapsed into a solid, rod-shaped structure with the now shrunken starter tube 25' surrounding the solid, rod-shaped vapor deposition composite portion 26'. Again, once the fiber has been drawn from the preform shown in FIG. 3C in the manner illustrated in FIG. 2 that portion 26' formed by vapor deposition becomes the optical waveguide fiber core while the shrunken, portion 25' becomes the fiber cladding.

FIG. 5 illustrates the previously mentioned need for special vapor stream generation program control particular to each starter tube of a size differing from that of a standard size. In FIG. 5A the same, single program has been executed in constructing a composite deposition layer 31 upon a starter tube 32 as that in constructing a composite deposition layer 33 on a starter tube 35 significantly larger than the starter tube 32. Since the two deposition control programs are the same the cross-sectional area of layers 31 and 33 are the same both before collapse as shown in FIGS. 5A and 5D and after collapse as shown in FIGS. 5B and 5E. However, since the same size fiber is drawn from each preform, and since the size or volume ratios of layer 31' to 32 ' and 33' to 35' are different, the core 32" in FIG. 5C will be larger than the fiber core 35" in FIG. 5F. Their indexes of refraction profiles will also differ as also illustrated in FIGS. 5C and 5F in order to go from the same minimums and maximums in different diametric distances.

As one specific example of practicing the present invention a one meter long extruded glass tube 40, as show in FIG. 6A, composed of better than 99.9% pure silica dioxide in fused quartz form was measured to determine its mean cross-sectional area. This measurement was made by determining tube wall thickness and outside diameter at some 12 axial locations along the tube. At each radial location a number of measurements were made at circumferentially spaced locations. The average wall thickness and tube outside diameter were then calculated and the mean cross-sectional area determined as being 200.0 $mm^2$.

Since a starter tube having a mean cross-sectional area of 210 $mm^2$ had been made the standard for which a Modified Chemical Vapor Deposition Process control computer program had been developed and previously implemented to form a graded core type preform, it was obviously necessary to increase the mean cross-sectional area of the extruded tube by 10 $mm^2$. At the particular vapor stream flow rate and torch velocity employed it was calculated that 5 passes of the torch would be required using $POCl_3$, $SiCl_4$ and $BCl_3$ entrained in pure oxygen. This was then done. The starter tube was then again measured as initially done and its mean cross-sectional area determined to be 210.0 $mm^2$. Thus, the additional composite layer 41, illustrated not to scale in FIG. 6B, had an area of 10 $mm^2$.

Ordinarily it is quite important that the index of refraction of that portion of the tube formed by vapor deposition match that portion formed by extrusion or free-drawing since optical theory dictates that the fiber cladding drawn from the starter tube portion of the preform be of uniform index of refraction throughout. Obviously, this would occur if $SiO_2$ were to be fused to the interior of an $SiO_2$ extruded or free-drawn tube. This, however, is not readily possible since the tube would have to be heated to some 1800°-1900° C. in order to cause the $SiO_2$ created by the Modified Chemical Vapor Deposition Process to fuse to the interior surface of the initially undersized tube. At this temperature the extruded or free-drawn tube would soften thereby necessitating the use of complex devices to maintain its diameter the use of which often produces some sorts of surface erosion. This being the case another glass having the same index of refraction, namely 1.46, as that of $SiO_2$ should be used. A mixture of $POCl_3$, $SiCl_4$ and $BCl_3$ can produce this with its vapor deposition occurring at a temperature several hundred degrees below the softening temperature of $SiO_2$. In addition, Freons, such as Freon 12, $CCl_2F_2$, may be substituted for $BCl_3$. The exact proportions of these particular dopants to be used depends on several factors such as the tube temperature, torch speed and deposition rate. After reaction the inner deposition layer 41 composed of $SiO_2 + B_2O_3 + P_2O_5$ had a uniform index of refraction of 1.46 matching that of the fused quartz outer layer 40 as shown in FIG. 4 following core deposition and tube collapse. The $B_2O_3$ had served to lower the index by an amount offset by that which the $P_2O_5$ had raised it.

Although the MCVD Process is the preferred one for enlarging the initially undersized starter tube, this enlargement may be effected by the Outside Vapor-Phase Oxidation Process or the Outside Vapor-Phase Axial Deposition Process. These well known processes are described in U.S. Pat. Nos. RE 28,029 and 4,224,046, respectfully.

It thus should be understood that the just described embodiment merely describes principles of the invention in selected, preferred forms. Many modifications, additions and deletions may be made thereto without departure from the spirit and scope thereof as set forth in the following claims.

What is claimed is:

1. A method of making an optical waveguide fiber preform starter tube having a tube wall of preselected cross-sectional area comprising the steps of extruding or free-drawing a glass tube having a tube wall cross-sectional area less than said preselected area; measuring the wall cross-sectional area of the glass tube; and fusing successive layers of glass having a composition different from that of the glass tube but an index of refraction substantially equal to that of the glass tube onto the interior surface of the tube by vapor deposition until the tube wall cross-sectional area is substantially equal to said preselected area.

* * * * *